United States Patent
Von Lerber et al.

(10) Patent No.: US 11,163,210 B2
(45) Date of Patent: Nov. 2, 2021

(54) ARITHMETIC-LOGICAL UNIT WITH SYNCHRONIZED LASER(S)

(71) Applicants: Tuomo Von Lerber, Helsinki (FI); Franko Küppers, Darmstadt (DE); Matti Lassas, Helsinki (FI); Klaus Hofmann, Darmstadt-Arheilgen (DE)

(72) Inventors: Tuomo Von Lerber, Helsinki (FI); Franko Küppers, Darmstadt (DE); Matti Lassas, Helsinki (FI); Klaus Hofmann, Darmstadt-Arheilgen (DE)

( * ) Notice: Subject to any disclaimer, the term of this patent is extended or adjusted under 35 U.S.C. 154(b) by 518 days.

(21) Appl. No.: 16/126,103

(22) Filed: Sep. 10, 2018

(65) Prior Publication Data

US 2019/0079369 A1 Mar. 14, 2019

(30) Foreign Application Priority Data

Sep. 11, 2017 (FI) ...................... 20175801

(51) Int. Cl.
*G02F 3/00* (2006.01)
*G06E 1/04* (2006.01)
*G06F 9/46* (2006.01)

(52) U.S. Cl.
CPC .................. *G02F 3/00* (2013.01); *G06E 1/04* (2013.01); *G06F 9/46* (2013.01)

(58) Field of Classification Search
CPC ... G02F 3/00; G02F 3/026; G02F 3/02; G02F 1/293; G02F 1/3515; G06E 1/04; G06F 9/46; G06F 7/57; G06N 3/067; G06N 3/004; G01S 3/10; H01S 5/065; H01S 3/10092; H01S 5/0656; H01S 5/4006;
(Continued)

(56) References Cited

U.S. PATENT DOCUMENTS

| 4,074,361 A | 2/1978 | Clow |
| 4,382,660 A | 5/1983 | Pratt et al. |
| 5,031,190 A | 7/1991 | Behfar-Rad |

(Continued)

FOREIGN PATENT DOCUMENTS

GB 2 450 543 12/2008

OTHER PUBLICATIONS

Search Report for FI20175801 dated Apr. 9, 2018, 2 pages.
(Continued)

*Primary Examiner* — Balram T Parbadia
(74) *Attorney, Agent, or Firm* — Nixon & Vanderhye PC

(57) ABSTRACT

An optical arithmetic-logical unit ["ALU"] processes one or more combined input signals, which result from a combination of multiple elementary input signals, each of which comprises at least one polarization component. One of the combined input signals is a synchronization signal having a phase and an amplitude. At least one laser has an output and is configured to synchronize with the synchronization signal, wherein the synchronization of the laser with the synchronization input signal generates an output signal, which preserves the phase of the synchronization signal but normalizes its amplitude. Generation of the output signal by said normalization of the synchronization signal provides the ALU with a capability of performing one or more arithmetic-logical operations on the one or more combined input signals.

13 Claims, 8 Drawing Sheets

(58) Field of Classification Search
CPC .... H01S 5/1071; H01S 5/1075; H01S 5/1046; B82Y 20/00
See application file for complete search history.

(56) References Cited

U.S. PATENT DOCUMENTS

| | | | | |
|---|---|---|---|---|
| 5,132,983 | A * | 7/1992 | Behfar-Rad | H01S 5/1071 372/8 |
| 5,295,010 | A * | 3/1994 | Barnes | G02B 6/43 359/107 |
| 6,483,614 | B1 | 11/2002 | Romaniuk | |
| 6,889,008 | B2 * | 5/2005 | Ogusu | H04B 10/25758 398/183 |
| 7,126,731 | B1 * | 10/2006 | DiJaili | G02F 3/00 359/108 |
| 7,414,779 | B2 * | 8/2008 | Huber | G01B 9/02069 359/333 |
| 2003/0058503 | A1 * | 3/2003 | Lou | H04L 7/0075 398/154 |
| 2003/0179425 | A1 | 9/2003 | Romaniuk | |
| 2004/0179841 | A1 * | 9/2004 | Shahar | G02B 6/12004 398/75 |
| 2004/0184491 | A1 * | 9/2004 | Wai | G02F 1/0136 372/27 |
| 2006/0023759 | A1 * | 2/2006 | Diels | H04B 10/25 372/25 |
| 2007/0189703 | A1 * | 8/2007 | Covey | B82Y 20/00 385/147 |
| 2008/0247018 | A1 * | 10/2008 | Bogoni | G02F 3/00 359/108 |
| 2010/0046950 | A1 * | 2/2010 | Cao | H04B 10/506 398/79 |
| 2010/0097677 | A1 | 4/2010 | Nazarathy et al. | |
| 2013/0044975 | A1 * | 2/2013 | Schlarb | H01S 3/1307 385/3 |
| 2018/0067378 | A1 * | 3/2018 | Qureshi | G02F 3/00 |

OTHER PUBLICATIONS

Prucnal et al., "Recent progress in semiconductor excitable lasers for photonic spike processing", *Advances in Optics and Photonics*. OSA Publishing [online], May 20, 2016, vol. 8, No. 2, pp. 228-299.

Lyubopytov et al., "Amplitude noise suppression and orthogonal multiplexing using injection-locked single-mode VSCEL", *Optical Fiber Communications Conference and Exhibition (OFC)*, Jun. 1, 2017, 3 pages.

Von Lerber et al., "Optical computing by injection-locked lasers", arXiv.org, Sep. 22, 2017, 47 pages.

Gomiaczyk et al., "Single-Photon Transistor Mediated by Interstate Rydberg Interactions", *Physical Review Letters*, Aug. 1, 2014, 5 pages.

Chen et al., "All-Optical Switch and Transistor Gated by One Stored Photon", *Science*, vol. 341, Aug. 16, 2013, pp. 768-770.

Tiarks et al., "Single-Photon Transistor Using a Forster Resonance", *Physical Review Letters*, Aug. 1, 2014, 5 pages.

\* cited by examiner

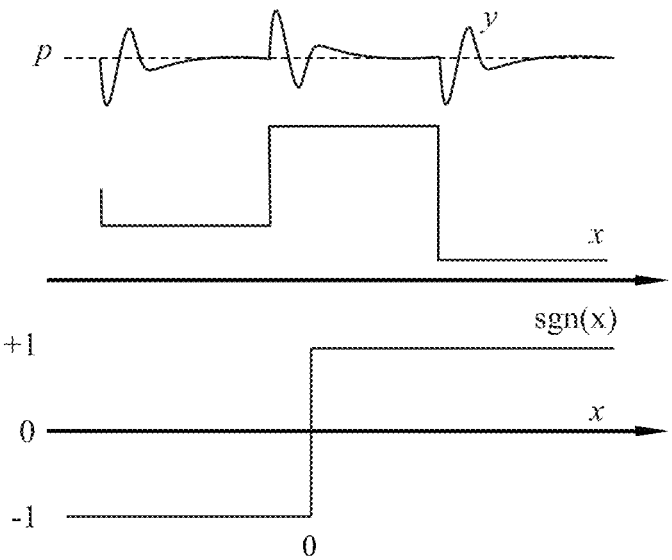
Fig. 1A
Fig. 1B
Fig. 1C
Fig. 1D
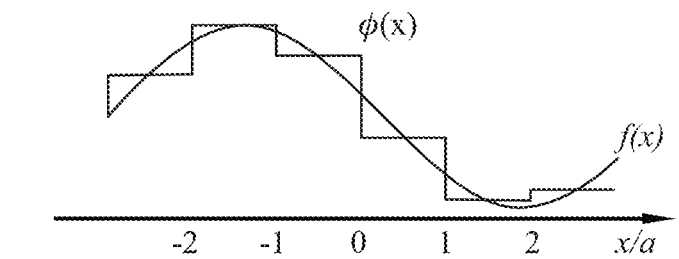
Fig. 2
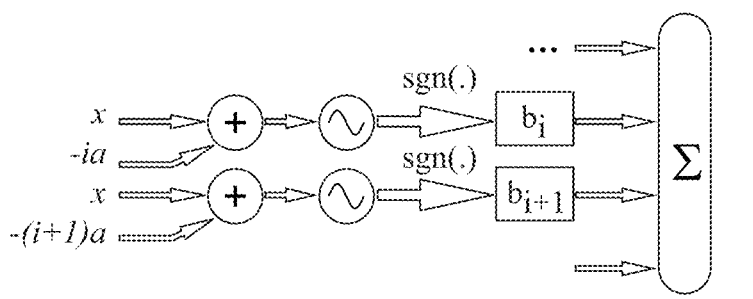

| bit # | A | B | X | $E_A$ | $E_B$ | $E_X$ | sum field | power | phase |
|---|---|---|---|---|---|---|---|---|---|
| 1 | 1 | 1 | 0 | 1 | 1 | -1 | 1 | 1 | 0 |
| 2 | 1 | 0 | 1 | 1 | -1 | 1 | 1 | 1 | 0 |
| 3 | 0 | 1 | 0 | -1 | 1 | -1 | -1 | 1 | π |
| 4 | 1 | 1 | 1 | 1 | 1 | 1 | 3 | 9 | 0 |
| 5 | 1 | 0 | 0 | 1 | -1 | -1 | -1 | 1 | π |
| 6 | 0 | 0 | 1 | -1 | -1 | 1 | -1 | 1 | π |
| ... | ... | ... | ... | ... | ... | ... | ... | ... | ... |
| 128 | 1 | 1 | 1 | 1 | 1 | 1 | 3 | 9 | 0 |

ARITHMETIC-LOGICAL UNIT WITH SYNCHRONIZED LASER(S)

This application claims priority to FI Patent Application No. 20175801 filed Sep. 11, 2017, the entire contents of which are hereby incorporated by reference.

FIELD OF THE INVENTION

The present invention generally relates to computing and specifically to an arithmetic-logical unit ("ALU"), whose operation is based on one or more self-sustaining oscillators.

BACKGROUND OF THE INVENTION

The history of computing has witnessed a multitude of techniques to perform arithmetic, where the development has progressed through mechanical devices to electronic circuits, and to quantum computers. Early computers were predominantly dedicated devices, many of them analogue calculators with fixed programming, which effectively solved a given problem. Later, calculators progressed toward general-purpose digital computers that could be programmed and re-programmed over again. On the leading edge of computing the competition between the dedicated one-solution devices versus the general-purpose digital computers still exists.

Undeniably, the triumph of modern computing belongs to electronic transistors that have enabled compact ubiquitous devices. Today an individual may carry a mobile handheld device that contains hundreds of millions of transistors and possess computing power that equals supercomputers of recent past. This is possible because transistors are increasingly small, energy efficient, and can be mass produced and integrated economically. Some of the most intriguing properties of transistors are their ability to amplify and restore the signal and to allow a weak signal to control a strong one.

A general-purpose optical computer has remained an elusive idea. The challenge has been the nature of photons that do not interact with each other in the vacuum, but require a medium of some kind. Also many optical nonlinear phenomena, such as four-wave mixing, require a high power pump to control a low power idler, which is an exact opposite to the operating principle of a transistor. Moreover, in many realizations of an optical logic the wavelength of the input differs from the output, which complicates design of cascaded systems. US patent application US2003/0179425 discloses an optical programmable logic device which based on the use of an optical limiting amplifier, specifically utilizing either an absorption diode or a magnitude limiter. Due to fundamental properties of optical limiting, the output signal of the device is dependent on input signal amplitude which limits the feasibility of such a solution for many applications. The search for and discussion about an optical transistor, a figurative optical building block that would imitate the electrical transistor in its versatility, has remained active.

SUMMARY OF THE INVENTION

It is an object of the present invention to alleviate one or more of the problems identified above. Specifically, it is an object of the present invention to provide control elements suitable for use in logical circuits operating in an all-optical domain.

An aspect of the present invention is an arithmetic-logical unit ["ALU"], which operates on one or more combined input signals. In some implementations the ALU comprises a combiner for combining two or more elementary input signals to one or more combined input signals. Alternatively or additionally, the ALU may comprise an input for receiving the one or more combined input signals. In either case, the combined input signals result from a combination of multiple elementary input signals, wherein each combined input signal comprises at least one polarization component, and wherein one of the combined input signals is a synchronization signal having a phase and an amplitude. The ALU further comprises at least one laser having an output. The ALU is configured to synchronize with the synchronization signal, wherein the synchronization of the laser with the synchronization input signal generates an output signal, which preserves the phase of the synchronization signal but normalizes its amplitude. The normalization may also suppress amplitude fluctuations. Therefore, the generation of the output signal by the normalization of the synchronization signal provides the ALU with a capability of performing one or more arithmetic-logical operations on the one or more combined input signals. Those skilled in the art will understand the difference between exact mathematical normalization and approximations of normalization, which is what tangible physical lasers are capable of. In the present disclosure, expressions like "normalization", "suppression of amplitude fluctuation of input signal" or "regeneration of signal" may be exact expressions when referring to mathematical models of normalization. However, when referring to tangible optical devices, such expressions mean approximations of the exact mathematical expressions. For the purposes of the present disclosure, the approximations are sufficiently accurate if an optical circuit of desired complexity can be constructed in such a manner that signal values remain unambiguous throughout the optical circuit.

An alternative definition for "normalization" and the related expressions is structural: the ALU of the present disclosure employs a non-linear region of a transfer function (output as function of input) to approximate the exact mathematical expressions.

The dependent claims and the following detailed description and drawings disclose optional features, which provide additional benefits and/or solve additional problems. Alternatively or additionally the dependent claims and description and drawings disclose specific use cases and applications for using the invention.

For instance, in some implementations the elementary input signals to the ALU have equal states of polarization and angular frequencies, and the elementary input signals have phases, which remain constant in respect to each other. In some other implementations the elementary input signals have orthogonal states of polarization. In this case the angular frequencies of different polarization modes (states of polarization) don't have to be exactly the same and the phases don't have to remain constant in respect to each other. For instance, assume two elementary input signals, both having two states of polarization. For one polarization state the angular frequencies of both elementary signals have to be the same; and the same is naturally true also for the other polarization state. However, the angular frequencies between the polarization states doesn't have to be the same. In another example where the input signals have different polarization states, one input signal may have x-polarization while the other has y-polarization. In this case the angular frequencies don't have to be the same.

In some implementations the ALU further comprises a bias input for receiving a bias signal, and the ALU is responsive to variations of the bias signal by altering said normalization. As will be shown later in this disclosure, alteration of the bias signal can change the truth table followed by logic gates constructed from one or more ALU's of the present disclosure.

In some implementations the input signals and output signals carry binary information.

In some implementations the ALU, or a circuit comprising multiple ALUs, is configured to perform at least two Boolean operations on the input signals, and wherein the at least two Boolean operations are selectable by altering the at least one bias signal.

In some implementations at least one laser of the ALU is a vertical cavity surface-emitting laser ["VCSEL"]. In other implementations at least one laser of the ALU is a gas laser, a liquid laser, or a solid-state laser—all three as known in the art. In some implementations the laser has a negligible linewidth enhancement factor (Henry factor). In other implementations at least one laser of the ALU is a plasmonic laser. A plasmonic laser is a type of laser which aims to confine light at a subwavelength scale far below the Rayleigh's diffraction limit of light, by storing some of the light energy through electron oscillations called surface plasmon polaritons. Due to the role of the surface plasma excitations in their operation, they are sometimes called SPASERs (Surface Plasmon Amplification by Stimulated Emission of Radiation). In some implementations, lasers of the ALU may comprise at least one laser of one or more of the following types: a semiconductor laser, a Raman laser, a ring laser, a disk laser and a nano-scale laser other than a plasmonic laser.

In some implementations, an apparatus may comprise two or more ALUs having bias inputs for receiving bias signals, and the two or more ALUs share at least one bias signal. Such an apparatus may be configured to yield an exclusive OR operation of two binary input signals, for example. A single-bit parity system configured to yield a parity function of a $2^n$-bit input word may be constructed from $2^n-1$ apparatuses as described herein.

In some implementations, at least one laser of the ALU is a multimode laser configured such that the generation of the output signal by said normalization of the synchronization signal provides the ALU with the capability of performing one or more arithmetic-logic operations on the one or more combined input signals simultaneously at one or more wavelengths.

BRIEF DESCRIPTION OF THE DRAWINGS

FIGS. 1A though 1D relate to an operating principle of the present invention;

FIG. 2 illustrates emulation of a three-signal input by use of amplitude and phase modulator in a tandem configuration;

DETAILED DESCRIPTION OF SOME SPECIFIC EMBODIMENTS

Figure 3:
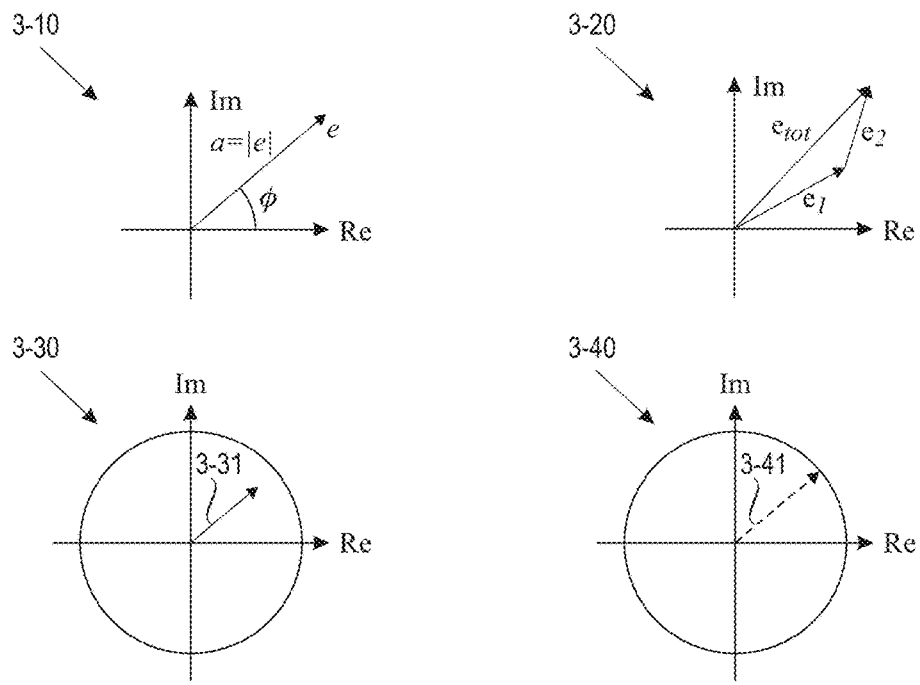
FIG. 3 illustrates generation of a normalized output signal.

FIGS. 1A though 1D relate to an operating principle of the present invention. Oscillators and oscillatory systems emerge in various shapes and forms, ranging from tidal waves to electrical circuits and down to atomic particles. Self-sustenance of an oscillator means that it has a non-linear damping, which returns a system back to a stable oscillation regime after a perturbation, as described by the van der Pol equation. Common to all self-sustained oscillators is that they are non-conservative and consume energy to maintain a stable limit cycle. For instance, a push on a base of a mechanical metronome affects the swing of the pendulum bob. If the perturbation does not repeat the metronome returns back to its original ticking frequency, yet, the stabilization consumes energy that will be taken from the spring.

Self-sustained oscillators may synchronize with an external force, given that the frequency of the perturbation is within the locking range of the oscillator (inside the Arnold's tongue). Especially, a weakly coupled slave oscillator is known to adopt the phase of the master while maintaining its original amplitude, a phenomenon that is regularly witnessed, for instance, in synchronized pendulum clocks or in injection-locked lasers. Mathematically the phase synchronization of the steady-state can be expressed as a normalization operation $y=px\|x\|^{-1}$, where x and y are complex amplitudes of the master and slave oscillations, respectively; and p is a dimensionless amplification factor determined by the slave. FIG. 1a schematically illustrates amplitudes of a master signal x and a weakly-coupled slave signal y. After a perturbation the amplitude of the slave returns to a constant while the phase remains locked with the master. The normalization operation can be further rendered into the signum function (see FIG. 1b) if the master phase Φ equals to an integer of π.

The present disclosure primarily considers optical systems with a single linear state of polarization, but the disclosure and its embodiments are also applicable to in optical system with two arbitrary orthogonal states of polarizations, in which case the signals would be expressed with two-dimensional complex amplitude vectors and normalizations of the same.

In a suitable topology a collection of normalization operations can be used to approximate an arbitrary continuous function $f: \mathbb{R}^n \to \mathbb{R}^n$. In practice this means that one may construct any conceivable logic operation or arithmetic, binary or otherwise.

As a simplified example of functions depending on one variable, we can use the fact that any continuous real-valued function $f(x): \mathbb{R} \to \mathbb{R}$, can be approximated by a function $\phi(x): \mathbb{R} \to \mathbb{R}$ that is a sum of signum-functions. More precisely, for arbitrarily large L>0 and arbitrarily small ε>0, there exists a function φ of the form $$\phi(x) = \sum_{i=-N}^{N} b_i$$

sgn(x−ia)+c such that for all x satisfying |x|<L we have |$f$(x)−φ(x)|<ε. Here, x is a real-valued input amplitude of the master (assumed master phase Φ=0 or π), a determines granularity of the approximation, 2N+1 is the number of signum operators, $b_i$ are the weights, and c is an offset (see FIG. 1c). In physical world this can be translated into a case, where a number of self-sustained oscillators are synchronized by a master and the input signals are combined with respective biases (see FIG. 1d). The slave oscillator outputs are weighted and summed together. The weighing can be realized, e.g., with varying coupling strengths or signal attenuations. It is assumed that the master and the slave lasers have the same angular frequencies, the signal phases stay controlled, and the oscillators in a cascaded system have nonreciprocal flow of information, i.e., the master controls the slaves but not the opposite. Unlike many other optical signal processing schemes we make no assumptions about the signal modulation format or the form of logic, Boolean or otherwise. This generality enables various realizations of Turing Universal computing devices as will be shown below.

FIG. 2 illustrates AND/OR gate truth tables and accompanied complex electric field amplitudes of inputs and a normalized laser output. An example of a Boolean logic circuit is a programmable AND/OR gate that consists of an injection-locked laser with three optical inputs and an output, where inputs A and B, and a bias X are combined at the laser. The inputs are assumed to carry equal optical power and the signals are phase encoded such that the binary numbers of 1 and 0 relate to phase-shifts of 0 and π and to complex electric field amplitudes of +1 and −1, respectively. When the bias, i.e., the program bit is set to 0 (whence the phase shift is π and the related electric field amplitude is −1), the normalization operation will produce the Boolean AND operation, and the bias bit of 1 will produce the OR operation as shown in FIG. 2.

FIG. 3 further illustrates generation of a normalized output signal. Reference number 3-10 denotes a phasor diagram, which illustrates complex numbers as a vector e having a real part Re and an imaginary part Im. As known in the art, a propagating electromagnetic wave can be expressed as a composition of plane waves. In turn, a plane wave propagating along z-axis can be written as $$E=e\ \exp[i(kz-\omega t)],$$

wherein e is the complex amplitude, ω is the angular frequency, t is the time, k is the wavenumber, and z is the spatial coordinate. The complex electric field amplitude e contains both a real-valued amplitude a and a phase φ, such that e=a exp(iφ). Should the exponential carrier wave term exp[i(kz−ωt)] be known, the complex field amplitude can be used to express a complex number.

Reference number 3-20 illustrates summation of two complex amplitudes assuming that the carrier waves are similar. Combination of multiple plane waves with similar carrier waves equals to summation of complex numbers, such that $$E_{tot}=E_1+E_2=(e_1+e_2)\exp[i(kz-\omega t)].$$

In a similar fashion, summation of many complex numbers (herein: elementary complex numbers) can be represented with a combination of respective plane waves (herein: elementary plane waves or elementary signals). In mathematics a summation of complex numbers results in a new complex number. Similarly, a combination of plane waves results in a new plane wave.

Normalization operation of a complex number e can be written as $$e^0=e|e|^{-1},$$

which means that the phase angle φ remains intact, but the amplitude a is normalized to unit length.

Injection locking, i.e., the synchronization of lasers is known in the art. There, an input signal is coupled into a laser, which adopts the angular frequency of the injected (typically a weak) signal. The laser emission amplitude remains largely intact regardless of the injected light (as shown by measurements). Mathematically, the injection locking resembles thus the normalization operation. Diagram 3-30 illustrates a non-normalized signal 3-31, while diagram 3-40 illustrates a normalized signal 3-41.

Injection locked lasers may perform similar operations to optical limiting amplifiers (also known in the art) though injection locked laser exhibit many benefits compared to optical limiting amplifiers (as used, for example, in US2003/0179425) which makes them more suitable for optical logic devices.

Firstly, lasers generally exhibit less self-phase modulation (SPM) compared to the optical limiting amplifiers. In self-phase modulation, the optical path length and thus the phase of the output signal changes depending on the input signal intensity which may lead to distortion of the information content of the signal. This is especially harmful when operations are cascaded and the error will propagate and accumulate from one logic gate to another. Semiconductor lasers are known in the art to exhibit some SPM though this effect may still be considered minor compared, for example, saturated semiconductor optical amplifiers that are used as limiting amplifiers. The SPM is even smaller in non-semiconductor solid state lasers, such as Nd:YAG lasers due to negligible linewidth enhancement factor (Henry factor).

Secondly, while injection locked laser are relatively insensitive to variations in the amplitude of the input signal, the intended limiting amplification operation in the optical limiting amplifiers is achieved only above certain amplitude level of the input signal. At low input signal amplitudes, the optical limiting amplifier behaves linearly, that is, as a conventional amplifier, which may be undesirable in an optical logic device. For this reason, the use of an optical limiting amplifier, especially in an optical logic device, may require precise control of the input intensity of light. As known in the art, perhaps the greatest benefit of phase modulated (encoded) signals over amplitude modulated signals is that the information is less sensitive to variations of signal transmission loss. If the optical logic device based on an optical limiting amplifier is dependent on signal amplitude, the very benefit of the phase encoded signal may be compromised. On the other hand, lasers may lock into weak input signals and provide an output with substantially constant amplitude, or at least the amplitude variation will be strongly quenched. If the input signal is weak, the locking will still happen, albeit with prolonged locking time, given that the input signal frequency (wavelength) is within the locking range of the laser. Therefore, lasers provide a far larger dynamic range for the input signal amplitude variation.

A collection of normalization operations can be used to approximate any continuous complex valued function, including real and binary valued functions or operations, because real and binary numbers are a subset of complex numbers. Consequently, normalization operations can be used to approximate arbitrary continuous real or binary valued functions.

As known in the art, a propagating electromagnetic wave may contain two orthogonal states of polarization. If the complex amplitude of each polarization component can be used to express a complex number, then the two states of polarization may be used to express two-dimensional complex vector $$\begin{pmatrix} e_x \\ e_y \end{pmatrix},$$

where $e_x$ and $e_y$ are both complex numbers.

If a laser is free of polarization-related optical anisotropies, it means that it has the same optical properties for both polarization modes. In such a case, the laser may be used to normalize both polarization modes, which means that the laser performs a two-dimensional normalization operation of a two-dimensional complex number.

Figure 4:
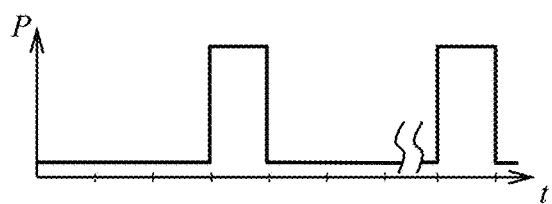
FIG. 4 illustrates truth tables for AND/OR gates and accompanied complex electric field amplitudes of inputs and a normalized laser output.
Figure 4:
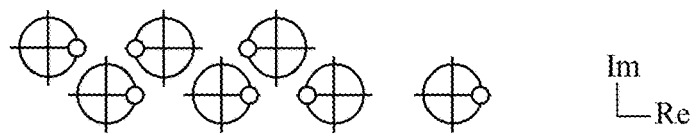
Figure 5:
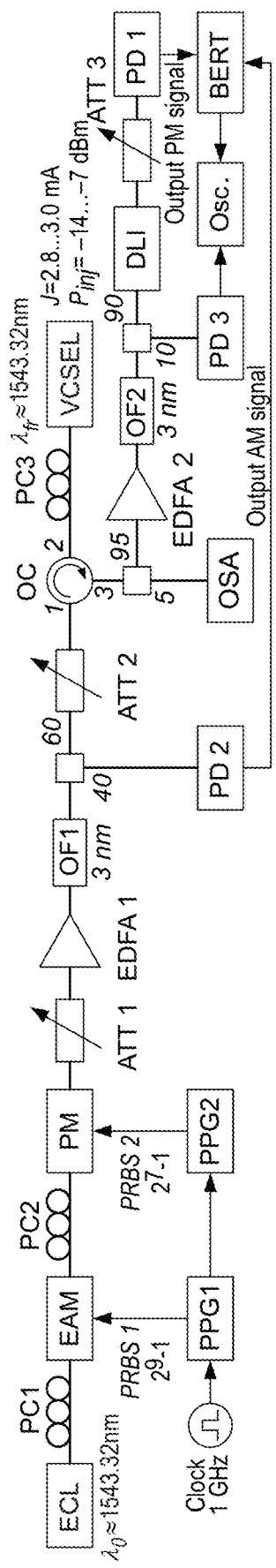
FIG. 5 is a schematic illustration of a measurement setup.
Figure 6:
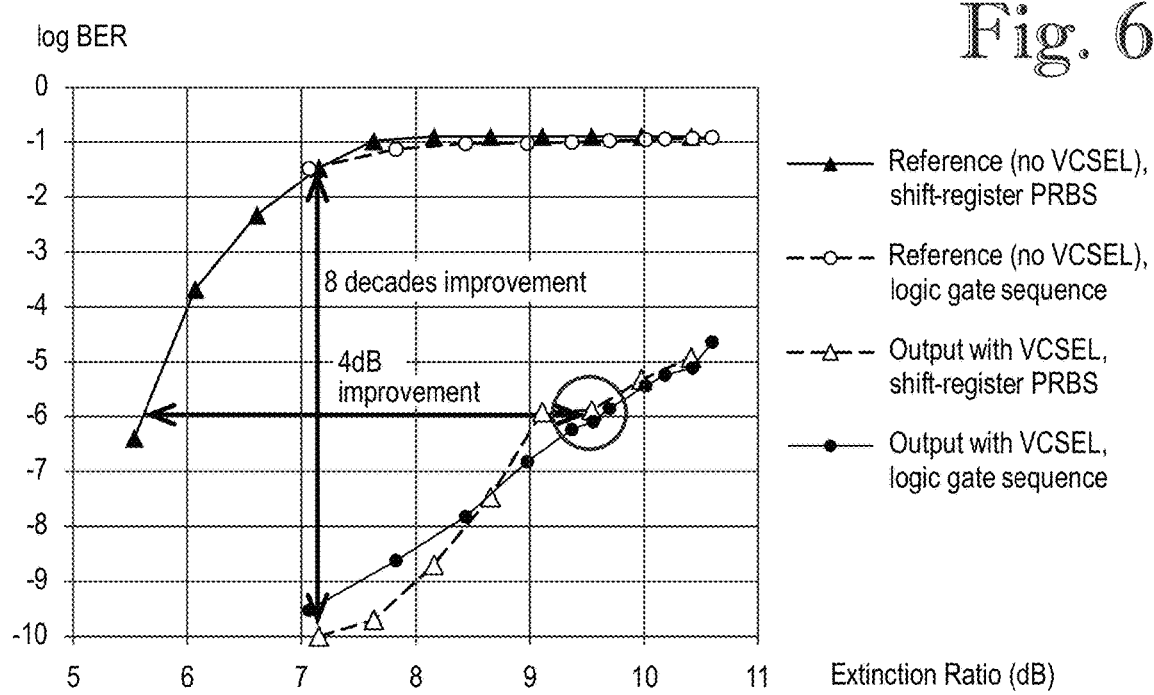
FIG. 6 shows a measured bit error rate with and without slave phase-synchronization laser for varying error rate.

FIG. 4 illustrates emulation of a three-signal input by use of amplitude and phase modulator in a tandem configuration where the terms A, B, and X relate to respective symbols of FIG. 2, while FIG. 5 is a schematic illustration of a measurement setup. FIG. 6 shows a measured logarithm of bit error rate (BER) with and without slave phase-synchronization laser for varying extinction ratios.

The inventors emulated a combined three signal input with an external cavity laser (ECL) that was followed by a tandem configuration of an electro absorption modulator (EAM) and a phase modulator (PM) that produced the desired multilevel hybrid encoding equivalent to the superposition of A, B, and X (see FIGS. 4 and 5). Two bit streams A and B were each given 128 randomly generated bits. Linear feedback shift registers were not used, but instead a computer-generated pseudo-random bit sequences (PRBS). The bias X was altered between 0 and 1 for each operation. The respective multilevel phase modulated signal had relative power levels of 1 and 9, i.e., the extinction ratio (ER) was 9.5 dB, and the phase shifts were 0 and $\pi$. The EAM and PM were each controlled by pulse pattern generators (PPG) that provided desired bit patterns at a rate of 1 Gbit/s. The PPGs were synchronized in time in such a manner that the modulated optical amplitude and phase symbols overlapped. The PM output was coupled with a variable attenuator (ATT), an erbium-doped fiber amplifier (EDFA), an optical filter (OF), and a second attenuator in order to control and optimize the optical power and the level of noise of the seeding signal.

The seeding signal was coupled into the slave VCSEL via an optical circulator (OC), which directed the returning signal into a second EDFA and a second OF. Phase of an optical signal cannot be measured directly from the optical power, but it has to interfere with some know reference, which in our case was a preceding symbol. Thus, we measured a differential phase of pulses in spirit of differential phase-shift keyed (DPSK) signals using delay-line interferometer (DLI) with free spectral range of 1 GHz. A single output of the DLI was measured with a p-i-n photodiode that was connected with a bit error rate tester (BERT). The expected bit sequence of the DPSK modulated output was pre-programmed into the BERT, which counted the errors.

In this experiment the slave VCSEL was pumped only slightly above its lasing threshold to enable maximal speed of operation. Furthermore, the setup had a number of polarization controllers and monitoring equipment, such as optical spectrum analyzer and digitizing oscilloscope for optimizations and control of the system. The optimal regime of injection locking, and of normalization operations, was obtained when the detuning between ECL master and VCSEL slave approached zero from the side of longer wavelengths.

Injection locking was optimized by setting the wavelength of the ECL close to the free-running wavelength of the VCSEL, and then the lock was fine-tuned by adjusting the pump current of the VCSEL. Depending on both the VCSEL pump current and the resulting detuning, an optimal optical injection power was set to minimize the BER of the demodulated DPSK receiver.

The slave VCSEL's ability to quench the amplitude modulation was measured first with a shift-register-based PRBS where the EAM and the PM were fed with dissimilar word lengths of $2^9-1$ and $2^7-1$, respectively. The ER was gradually increased and the BER was measured with and without the presence of the slave VCSEL (see FIG. 6). In absence of the VCSEL the BER>$10^3$ when ER was at 6.5 dB, and when ER was above 7.5 dB, the BER became saturated. As was evident, the uncompensated DPSK receiver performance was severely compromised with increase of the amplitude modulation. When the slave VCSEL was present, the BER was improved by about 8 decades at ER=7.0 dB; or at fixed BER of $10^{-6}$ the improvement in ER sustainability was about 4 dB. All BER measurements were performed under constant receiving power and optical signal-to-noise ratio. The BER improvement is a proof of a successful injection-locking of the VCSEL and it could be interpreted as a consequence of reduction of information entropy.

The inventors obtained similar BER readings when the shift-register PRBS was changed to logic gate sequence feed. As noted above, the emulated combination of inputs A, B, and bias X had an ER of 9.5 dB, which in the current setup translated in a BER of $10^{-6}$. Should the AND/OR gate be combined with a NOT operation, which in the present case is a phase shift of $\pi$, a complete functional set of Boolean operations will be obtained.

Figure 7A:
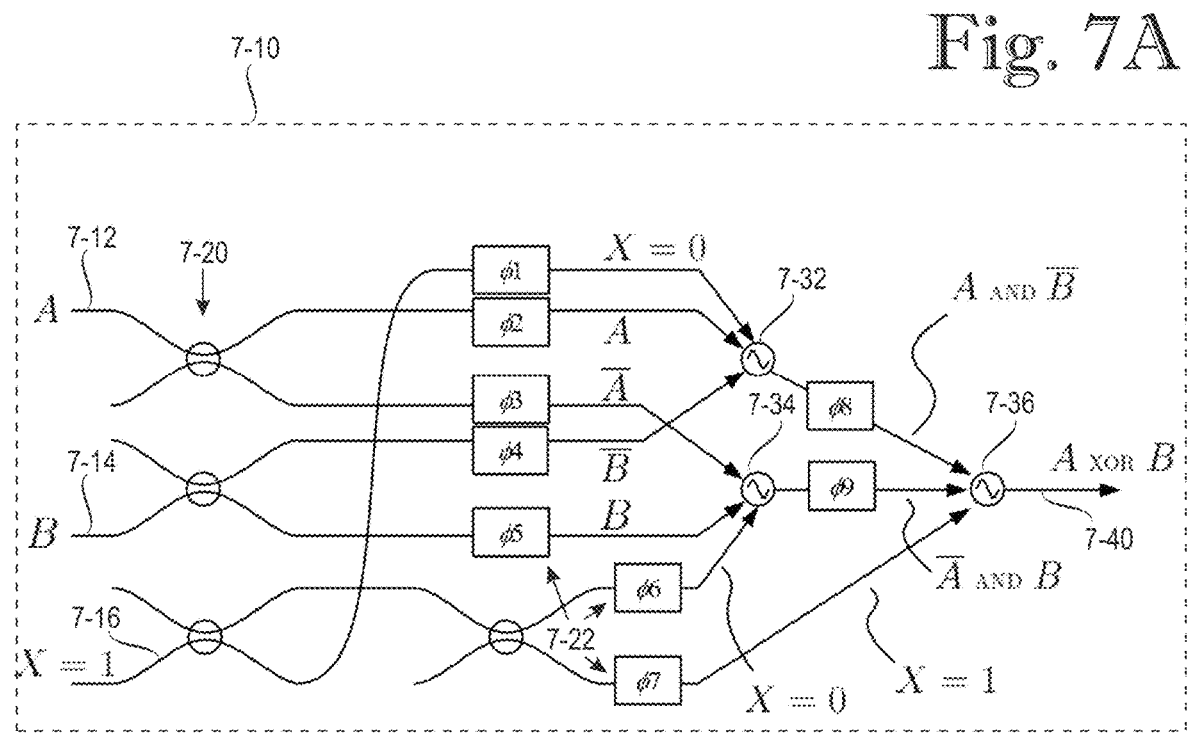
FIGS. 7A and 7B show how multiple bias-programmable logical gates can be combined to generate more complex logical gates with arbitrary truth tables.
Figure 7B:
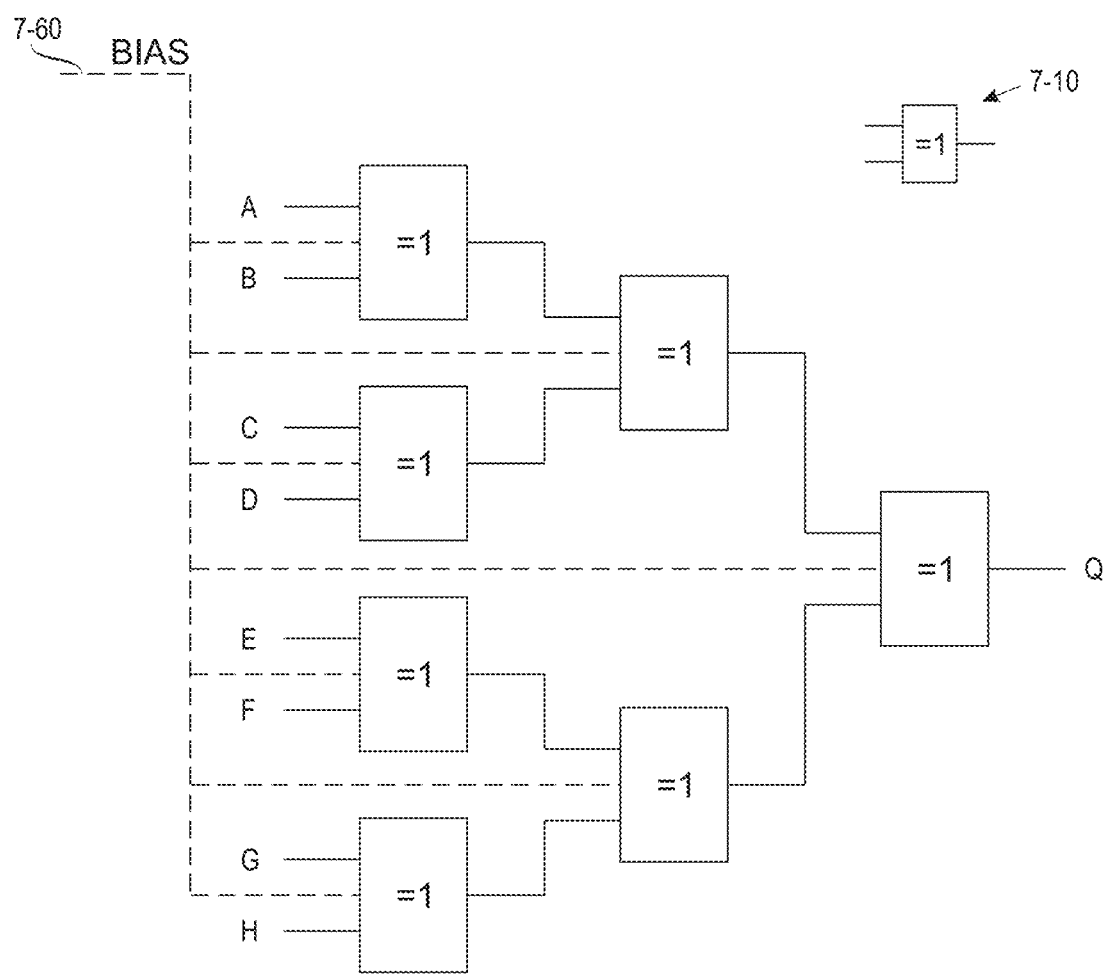

FIGS. 7A and 7B show how multiple bias-programmable logical gates can be combined to generate more complex logical circuits. FIG. 2 and its description explained how to construct a bias-programmable AND/OR optical gate. The programmable AND/OR gate uses phase encoded signals, wherein the binary numbers 1 and 0 relate to phase-shifts of 0 and $\pi$, and to complex electric field amplitudes of +e and -e, respectively.

The specific logical circuit shown in FIG. 7A, denoted by reference number 7-10, comprises three optical AND/OR gates, which collectively implement an exclusive-OR function (XOR). Those skilled in the art will realize that the principle described herein can be generalized to other logical circuits with arbitrary truth tables.

The XOR gate 7-10 has two Boolean logic inputs A and B, denoted by reference numbers 7-12 and 7-14, and an output 7-40. As is known in the art, an XOR gate can be constructed, for instance, by use of a pair of AND gates 7-32, 7-34, followed by an OR gate 7-36. Algebraically the XOR operation can be expressed as:

$$A \text{ XOR } B = A \cdot \overline{B} + \overline{A} \cdot B.$$

Herein, $\overline{A}$ and $\overline{B}$ refer to negations of Boolean values of A and B, respectively.

An equivalent Boolean expression is:

$$A \text{ XOR } B = (A \text{ AND } \overline{B}) \text{ OR } (\overline{A} \text{ AND } B).$$

In addition to the two Boolean input signals A and B, the XOR gate 7-10 described herein has a bias input signal X, denoted by reference number 7-16. In general, the bias input could be used to receive an additional logic signal, but in the present example it is permanently set to a logical value of 1. Directional couplers, denoted by reference number 7-20, distribute non-inverted and inverted versions of their respective input signals. Phase-shifters $\phi 1$ through $\phi 9$, denoted by reference number 7-22, may be used to adjust amplitudes and the phases of the signals to ensure that bias signals X; and signals A and $\overline{B}$; and signals $\overline{A}$ and B; and signals (A AND $\overline{B}$) and ($\overline{A}$ AND B) have desired optical phases and optical power levels with respect to each other. The overall bias signal X=1 is inverted to X=0 for gates 7-32 and 7-34. As a result, gate 7-32 computes an AND operation of A and $\overline{B}$, while gate 7-34 computes an AND operation of $\overline{A}$ and B. (The truth tables are shown and explained in connection with FIG. 2.) For gate 7-36, the bias input X is inverted twice, or effectively not inverted, and gate 7-36 computes an OR operation of the outputs of gates 7-32 and 7-34. Therefore the circuit 7-10 produces A XOR B at its output 7-40. Those skilled in the art will realize that several other implementations are possible. A benefit of the present disclosure is that the outputs of the lasers 7-32, 7-34 and 7-36 are constrained to normalized values by virtue of the normalization capability of phase-synchronized lasers. Specifically, it is the laser which normalizes the amplitude and thereby suppresses amplitude noise, while phase noise is suppressed by use of a common bias. As a result, each successive stage receives input signals which have well-defined (regenerated) signal values, whereby the present disclosure can be applied to optical circuits of virtually arbitrary complexity without accumulation of phase and/or amplitude errors.

A single-bit parity system configured to yield a parity function of a $2^n$-bit input word may be constructed from $2^{n-1}$ apparatuses as described earlier (e.g., XOR gates or other logical circuits with arbitrary truth tables known in the art). An array of single-bit parity systems may be combined to a multi-bit parity system, which comprises a register configured to hold an array of $2^m$ words with a bit length of $2^n$; a first plurality of single-bit parity systems as described above, configured to yield a parity function of rows of the array; and a second plurality of single-bit parity systems as described above, configured to yield a parity function of columns of the array. If a parity error occurs, the first plurality and second plurality of single-bit parity systems jointly indicate which word and which bit in the word caused the parity error.

FIG. 7B shows a cascade of seven XOR gates 7-10 coupled to share the same bias signal, denoted by reference number 7-60. A first tier of four XOR gates 7-10 performs exclusive-OR operations on four pairs of input signals (A, B) through (G, H). A second tier of two XOR gates performs exclusive-OR operations from the XOR gates of the first tier, while a third tier of one XOR gate yields the XOR of the XOR gates of the second tier. In this example all XOR gates share the same bias signal 7-60, but other configurations are also possible.

Figure 8A:
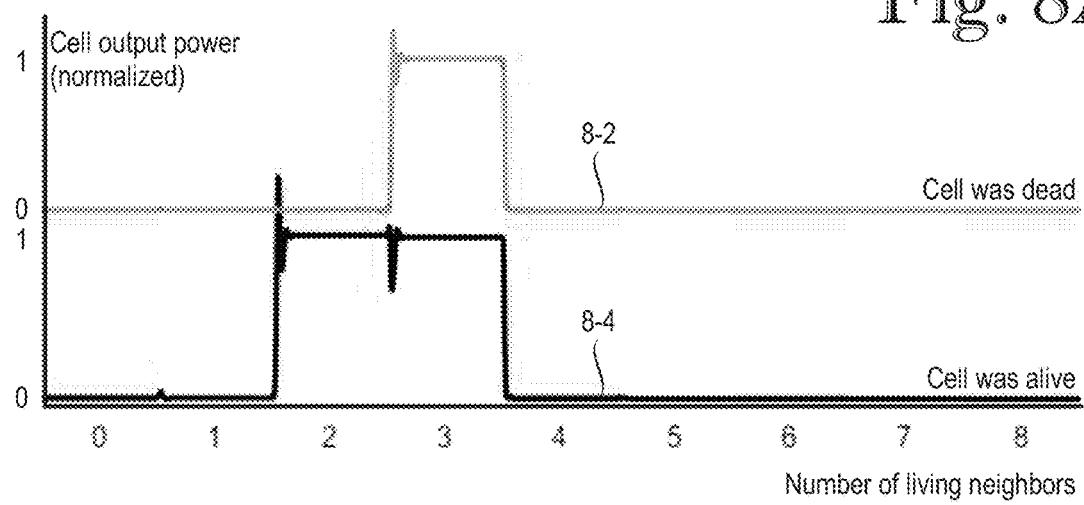
FIGS. 8A through 8C illustrate results of simulations in which real optical devices according to the present disclosure were combined in a simulation model in the context of John Conway's Game of Life.
Figure 8B:
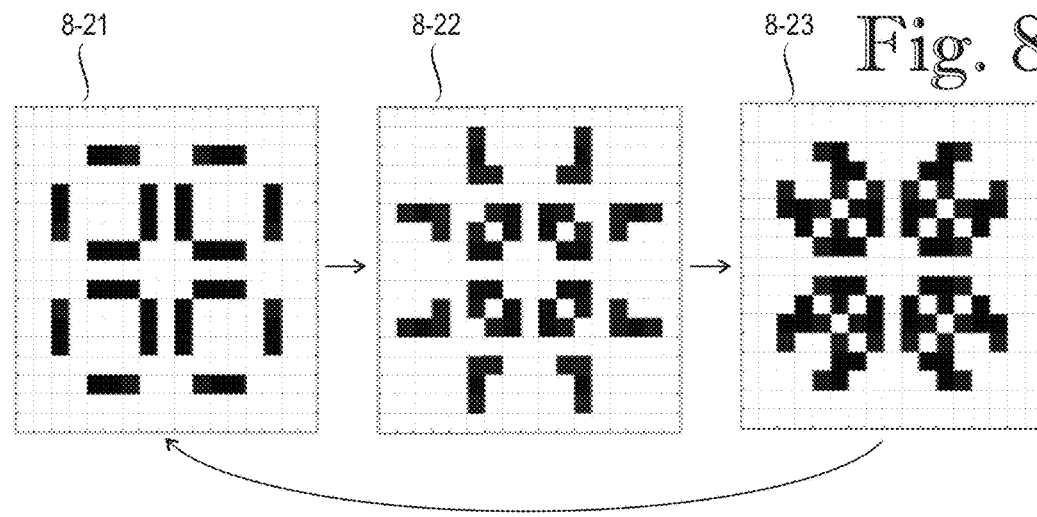
Figure 8C:
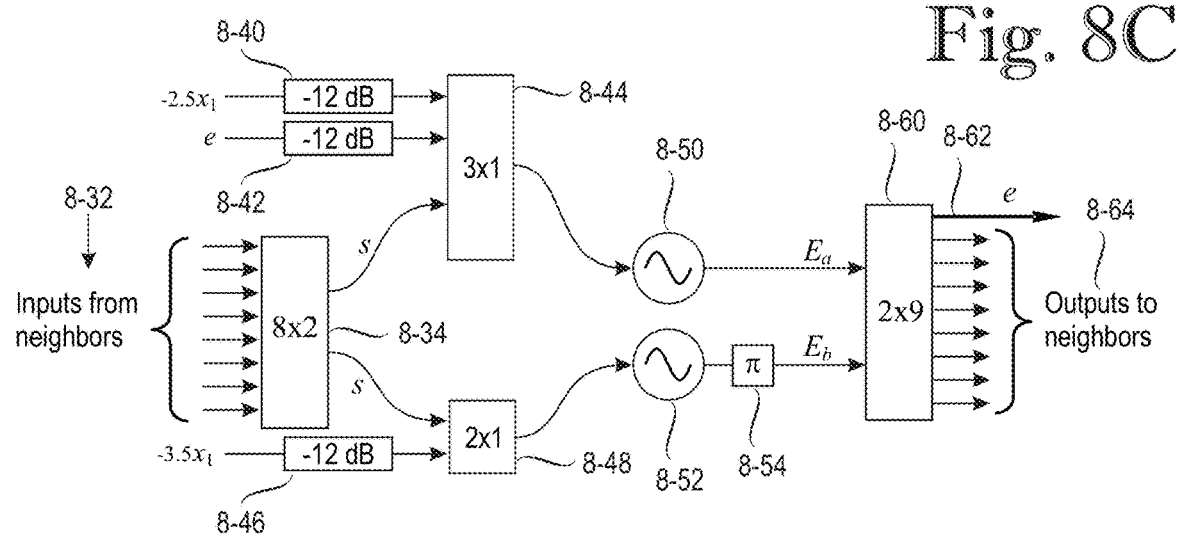

FIGS. 8A through 8C illustrate results of simulations in which real optical devices according to the present disclosure were combined in a simulation model in the context of John Conway's Game of Life.

The Game of Life ("GoL") is a cellular automaton devised by the British mathematician John Horton Conway in 1970. It is a zero-player game, meaning that its evolution is determined by its initial state, requiring no further input. One interacts with the Game of Life by creating an initial configuration and observing how it evolves on a (theoretically infinite) two-dimensional grid of cells. The game progresses on discrete time steps such that the states of cells (living or dead) determine the outcome of the next generation. In the context of the present disclosure, the GoL example serves primarily as a demonstration of a model of optical devices configured to operate in cascades. At the time when the invention was made, optical circuits cannot be manufactured in densities comparable to their electronic cousins, which is why large-scale integration of real-world optical devices was studied by simulation. Another purpose for the GoL example is demonstration of various capabilities of the optical devices according to the present disclosure, including execution of non-Boolean logic, use of amplitude-encoded signals, and a second proof of Turing's Universality.

A GoL cell obeys three simple rules, which determine its fate on the next generation: If the cell is alive, then it will stay alive if it has either 2 or 3 living neighbors. If the cell is dead, then it will revive only if it has exact 3 living neighbors. If the cell doesn't stay alive or revive, it will be dead.

Mathematically, these rules can be translated into summation of two signum functions, both being dependent on the number of living neighbors. The first signum function changes its state when the number of living neighbors is 1.5, and the second changes state when the number of living neighbors is 2.5. In FIG. 8A, curve 8-2 depicts the state of a cell (0=dead, 1=alive) for generation i+1 versus the number of its live neighbors in generation i, for the case when the cell was dead in generation i, Curve 8-4 depicts the state of a cell for generation i+1, for the case when the cell was alive in generation i.

FIG. 8B shows an exemplary pulsating GoL pattern on a grid of 17×17 cells (or larger). The pulsating pattern has three states, denoted by reference numbers 8-21, 8-22 and 8-23, after which the pulsating pattern repeats itself.

FIG. 8C shows an optical implementation for a computational decision-making unit for a GoL cell. Component-wise the cell consists of a pair of lasers, four couplers, phase control, and a number of attenuators. At steady-state each laser 8-50, 8-52 emits a constant optical power of 1, and the total output of the cell is thus 2 or 0 for states of alive and dead, respectively. In the simulation, the lasers were of solid-state type, and hence the linewidth enhancement factor is 0. For the sake of simplicity, and without loss of generality, the optical media and couplings are assumed lossless.

The cell output power is divided evenly between nine paths, one path 8-62 for feedback (e) and eight paths 8-64 for feeding the neighbors—hence a 2×9 coupler 8-60—resulting in an optical power of $X_1 = x_1 x^*_1 = 0.22$ for each instance when the cell is alive, where $x_1$ is the electric field amplitude of the living cell. At input an 8≠2-coupler 8-34 combines optical fields 8-32 from n={0 . . . 8} living neighbors and provides a signal $s = nx_1/\sqrt{16}$ for two arms. One arm leads to 3×1 coupler 8-44 and the other arm to 2×1 coupler 8-48. The electric field amplitude of the feedback e, is given by e={0x_1}. The input side has also two biasing signals 8-40 and 8-46, driven with respective values of $-2.5x_1$ and $-3.5x_1$. It is assumed that all bias signals across the cells have a common narrow-bandwidth light source and the phases stay controlled. The bias and feedback paths have constant attenuations of −12 dB in order to equalize the scales of power levels with the signals s.

The 3×1 coupler 8-44 at the upper optical path combines the signals 8-32 of the living neighbours s, the attenuated feedback e 8-42, and the attenuated bias $-2.5x_1$ 8-40. If the cell was dead (e=0) in the previous generation, then the sign of the output electric field of the 3×1 coupler 8-44 is negative when 2, and positive otherwise. If the cell was alive ($e=x_1$) then the sign of the field amplitude is negative when and positive otherwise. The light is injected into a laser 8-50 which normalizes the signal. Its steady-state electric field amplitude can be expressed as:

$$E_a = \begin{cases} -1 & \text{if } (n \leq 2 \wedge e = 0) \vee (n \leq 1 \wedge e = x_1) \\ +1 & \text{otherwise} \end{cases}.$$

The 2×1 coupler 8-48 at the lower optical path combines the signals 8-32 of the living of the neighbourhood s and the attenuated bias $-3.5x_1$ 8-46. The output phase of laser 8-52 is shifted by $\pi$ phase shifter 8-54, which inverts the sign of the steady-state electric field:

$$E_b = \begin{cases} +1 & \text{if } n \leq 3 \\ -1 & \text{otherwise} \end{cases}.$$

The normalized electric fields are combined at the output by the 2×9 coupler 8-60.

The lasers of the GoL cells were modelled using differential rate equations of solid-state lasers with a linewidth enhancement factor $\alpha=0$. This means that the lasers were assumed to be conventional solid-state type, not semiconductor ones. The optical power of a cell output is depicted in FIG. 8A for increasing number of living neighbours. The increments occur in 2 ns intervals and the change of the neighbourhood signal s is assumed instantaneous. As was evident from the simulation, at steady-state the cell obeys the rules of the game.

For this simulation the inventors introduced an idealized memory element that stored the complex electric field amplitudes of the cells after the lasers had reached steady states, not unlike a sample-and-hold memory circuit for each cell. For each successive generation, the memory was read and the new states of the cells were computed. The introduced memory was a verbatim of a cell field output and it did not regenerate a signal. In other words, it allowed accumulation of phase and amplitude errors. During the course of 100 successive generations no degradation in gaming performance was observed. This shows that although the normalization performed by the tangible optical devices described herein may not be mathematically a perfect one, it is still more than adequate for all-optical computing schemes far more complex than those disclosed in the prior art.

Still Further Applications

Embodiments of the present disclosure can be used either in a feed-forward mode or in a feedback mode. In one example of a feed-forward mode, the light emitted from a first laser of a first ALU propagates to and is coupled into a second laser within the first ALU. In another example of a feed-forward mode, the light emitted from a first laser of a first ALU propagates to and is coupled into a second laser of a second ALU. In feed-forward mode the light emitted by neither of the second lasers reaches the first laser of the first ALU. In another feed-forward embodiment the light emitted by either of the second lasers does not injection-lock the first laser of the first ALU. In feedback mode, the light emitted by the first laser(s) and by the second laser(s) can reach the second laser(s) and the first laser(s), respectively. An example of this type of operation mode and arrangement would be a Cellular Neural Network (CNN) in which each cell comprises one or more ALUs.

The feed-forward arrangement can be realized in such a manner that an ALU or the intermediate space between the ALUs may contain optically asymmetric materials, such as magneto-optical materials, which form isolators that prohibit propagation of light in one direction but allow light to propagate in the opposite direction.

Figure 9A:
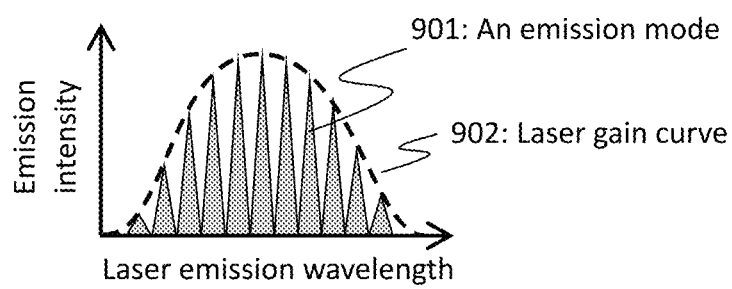
FIGS. 9A through 9C illustrate simultaneous injection-locking at multiple wavelengths.
Figure 9B:
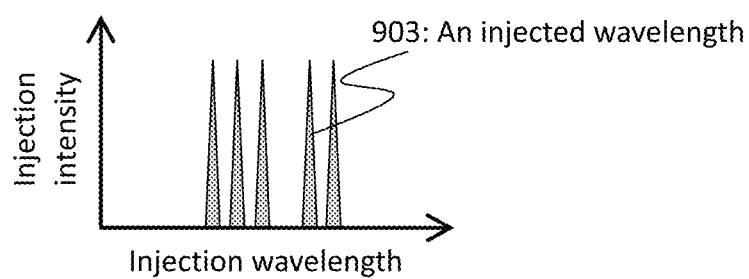
Figure 9C:
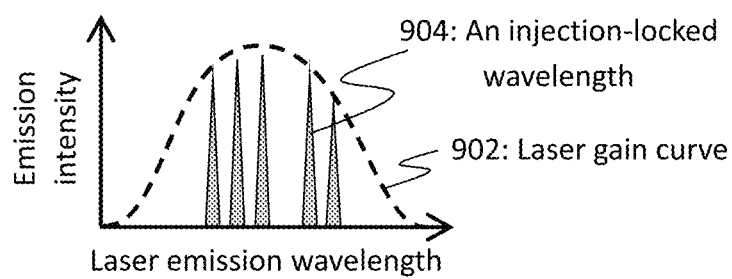

In some embodiments, one or more lasers of the ALU may be configured to process multiple simultaneous wavelengths according to one or more principles discussed in the following. It is known in the art that some lasers may emit light at multiple simultaneous wavelengths due to multiple emission modes 901 which follow a laser gain curve 902, as schematically illustrated in FIG. 9A. If such a laser is injected with light that contains many wavelengths, where one or more injected wavelengths 903 match the wavelengths 901 of the laser as illustrated in FIG. 9B, the laser may lock at these one or more wavelengths as illustrated in FIG. 9C and thus enable normalization operations simultaneously at multiple wavelengths 904 following the laser gain curve 902. Depending on the laser properties, it may be possible that those multiple wavelengths can be independent, i.e., operations at one wavelength do not affect operations at another wavelength. However, depending on the laser properties it may also be possible that the presence of multiple simultaneous wavelengths (in other words, multiple carrier frequencies) interact through the laser medium, e.g., through cross-gain modulation or through cross-phase modulation, and affect the signal processing operations.

Figure 10A:
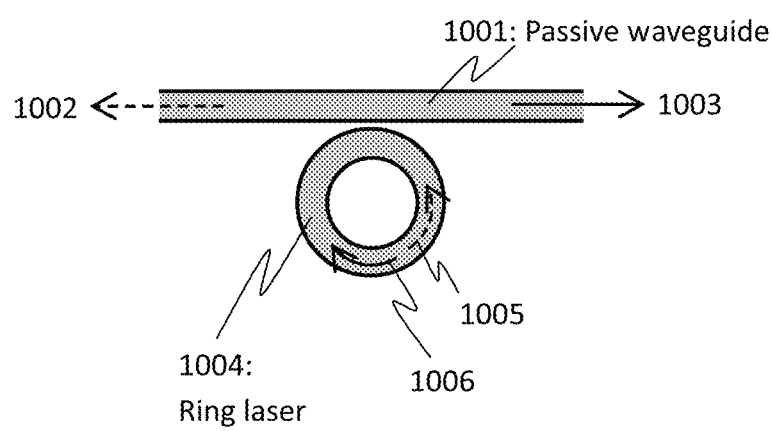
FIGS. 10A through 10B illustrate the use of ring lasers for feed-forward circuits.
Figure 10B:
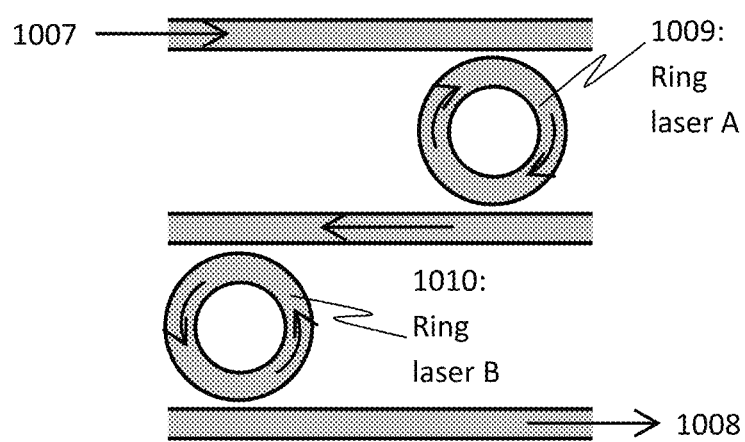

In some embodiments, one or more lasers of the ALU may be lasers capable of unidirectional laser emission. As illustrated in FIG. 10A, a free-running ring laser 1004 that has no asymmetry in traveling wave propagation preference may host two beams 1005, 1006 that propagate in opposing directions in a closed loop, i.e., it may have bi-directional and sometimes bi-stable operation. Should the ring laser be seeded (or injection locked) only from one direction of propagation, then the laser 1004 may have unidirectional operation, for example, such that there is output emission 1003 in the passive waveguide 1001 due to clockwise rotating beam 1006 while no output emission 1002 is provided by counter-clockwise rotating beam 1005 or vice versa if the seeding direction is reversed. As illustrated in FIG. 10B, unidirectional operating lasers 1009, 1010 may be used to construct feed-forward circuits, where the injected light 1007 propagates from one laser to another and to the output 1008, but not in the opposite direction. Specifically in FIG. 10B, the laser A 1009 injects light to the laser B 1010, but laser B 1010 does not inject light to laser A 1009. Similar arrangement may be constructed with any type of ring lasers, such as disk lasers. The above said asymmetry in traveling wave preference can be achieved either by injection locking or by some other construction known in the art.

CONCLUSIONS

The inventors have developed a new multipurpose computing scheme based on phase-synchronization of self-sustained oscillators (lasers). The scheme can be used to approximate any continuous single-variable or multivariable function. The principle offers many possible realizations of Universal Machine and we show the Universality by two examples of optical computing, one for phase-encoded and another for amplitude-encoded signals with the AND/OR gate and the GoL cellular automaton, respectively. Measurements have shown that the optical logic can operate and change the program at a rate of 1 gigaoperations/s with only a one-in-a-million rate of failure. The logic gate demonstration uses a VCSEL, which could open opportunities for wafer-level optical integration and high-volume manufacturing. We also show that multiple operations can be cascaded without apparent degradation in performance.

The inventors perceive optical computing as the most prominent application area, yet, the proposed concept is a general one, and extendable to other types self-sustained oscillators and computing substrates. The speed of operation depends of time constants of the oscillator and the strengths of signal coupling, and we expect improvements in area of optical computing by careful selection of laser active medium and resonators properties.

Although a laser may not be a perfect replacement for an electronic transistor yet, the results disclosed herein show that many desirable properties may be obtained by use of phase-synchronization of a laser: the normalization operation regenerates the signal amplitude, a weak input signal may control a strong output, and multiple operations may be cascaded. Additionally, optical computing benefits the potential to use two orthogonal polarization states to express two numbers and normalizations of the same. This opens venues for processing of two-dimensional complex numbers, real numbers, or Boolean numbers.

ABBREVIATIONS

ATT: variable attenuator
BER(T): bit error rate (tester)
DLI: delay line interferometer
DPSK: differential phase-shift keyed
EAM: electro absorption modulator
ECL: external cavity laser
EDFA: erbium-doped fiber amplifier
ER: extinction ratio
OC: optical circulator
OF: optical filter
OSA: optical spectrum analyzer
Osc.: digitizing oscilloscope
PD: p-i-n photodiode
PM: phase modulator
PPG: pulse pattern generator
PRBS: pseudo-random bit sequence
SPM: self-phase modulation
VCSEL: vertical-cavity surface-emitting laser

REFERENCE DOCUMENTS

1. H. Gorniaczyk, C. Tresp, J. Schmidt, H. Fedder, and S. Hofferberth, Phys. Rev. Lett. 113, 053601 (2014). http://dx.doi.org/10.1103/PhysRevLett.113.053601
2. D. Tiarks, S. Baur, K. Schneider, S. Dürr, and G. Rempe, Phys. Rev. Lett. 113, 053602 (2014). http://dx.doi.org/10.1103/PhysRevLett.113.053602.
3. W. Chen, K. M. Beck, R. Bücker, M. Gullans, M. D. Lukin, H. Tanji-Suzuki, and V. Vuletić, Science 341, 768 (2013). DOI: 10.1126/science.12381

The invention claimed is:

1. An apparatus comprising a plurality of arithmetic-logical units ["ALUs"], wherein the plurality of ALUs comprise two or more ALUs sharing at least one bias signal and each ALU of the plurality of ALUs comprises:

a combiner for combining two or more elementary optical input signals to one or more combined optical input signals and/or an input for receiving one or more combined optical input signals, which result from a combination of two or more elementary optical input signals, wherein one of the combined optical input signals is a synchronization signal having a phase and an amplitude;

at least one laser having an output and configured to synchronize with the synchronization signal using injection locking, wherein the synchronization of the laser with the synchronization signal using injection locking generates an optical output signal, which preserves the phase of the synchronization signal but normalizes its amplitude;

whereby the generation of the optical output signal by said normalizing corresponds to performing one or more arithmetic-logical operations on the two or more elementary optical input signals combined to the one or more combined optical input signals; and a bias input for receiving a bias signal, wherein the ALU is responsive to variations of the bias signal by altering said normalizing of the amplitude of the synchronization signal.

2. The apparatus of claim 1, wherein the elementary optical input signals have equal states of polarization and angular frequencies, and wherein the elementary optical input signals have phases, which remain constant in respect to each other in time.

3. The apparatus of claim 1, wherein said two or more elementary optical input signals comprise two elementary optical input signals having orthogonal states of polarization.

4. The apparatus of claim 1, wherein at least some of the two or more elementary optical input signals, the one or more combined optical input signals and at least one optical output signal carry complex-valued information.

5. The apparatus claim 1, wherein at least some of the two or more elementary optical input signals, the one or more combined optical input signals and at least one output signal carry real-valued information.

6. The apparatus of claim 1, wherein at least some of the two or more elementary optical input signals, the one or more combined optical input signals and at least one output signal carry binary information.

7. The apparatus of claim 1, wherein each ALU of the plurality of ALUs is configured to perform at least two Boolean operations on the two or more elementary optical input signals combined to the one or more combined optical input signals, and wherein the at least two Boolean operations are selectable by altering the at least one bias signal.

8. The apparatus of claim 1, wherein the at least one laser is selected from a following group of laser types: a vertical cavity surface-emitting laser, a plasmonic laser, a semiconductor laser, a solid-state laser, a Raman laser, a ring laser, a disk laser and a nano-scale laser other than a plasmonic laser.

9. The apparatus of claim 1, wherein the at least one laser comprises one or more multimode lasers configured such that the generation of the output signal by said normalizing of the synchronization signal corresponds to performing one or more arithmetic-logic operations on the two or more elementary optical input signals combined to the one or more combined optical input signals at a wavelength or simultaneously at two or more wavelengths.

10. The apparatus of claim 1, wherein at least two of the lasers are used in a feed-forward mode.

11. The apparatus of claim 1, wherein at least two of the lasers are used in a feedback mode, wherein in the feedback mode light emitted by one or more first lasers of said at least two of the lasers reaches one or more second lasers of said at least two of the lasers and light emitted by the one or more second lasers reaches the one or more first lasers.

12. The apparatus of claim 1, wherein the apparatus is configured to yield an exclusive OR operation of two binary input signals.

13. A single-bit parity system, comprising:
$2^n-1$ apparatuses according to claim 12; and
wherein the system is configured to yield a parity function of a $2^n$-bit input word.

* * * * *